July 3, 1962    F. BUSKE ET AL    3,042,421
TRAILER FOR TRANSPORTATION OF ELONGATED FREIGHT
Filed May 16, 1961    4 Sheets-Sheet 1

Fritz Buske
Gerhard Kuschel
*INVENTORS.*

BY

AGENT.

July 3, 1962   F. BUSKE ET AL   3,042,421
TRAILER FOR TRANSPORTATION OF ELONGATED FREIGHT
Filed May 16, 1961   4 Sheets-Sheet 2

Fritz Buske
Gerhard Kuschel
*INVENTORS.*

BY

AGENT.

July 3, 1962 F. BUSKE ET AL 3,042,421
TRAILER FOR TRANSPORTATION OF ELONGATED FREIGHT
Filed May 16, 1961 4 Sheets-Sheet 3

Fritz Buske
Gerhard Kuschel
*INVENTORS.*

BY Karl F. Ross

AGENT.

July 3, 1962   F. BUSKE ET AL   3,042,421
TRAILER FOR TRANSPORTATION OF ELONGATED FREIGHT
Filed May 16, 1961   4 Sheets-Sheet 4

Fritz Buske
Gerhard Kuschel
*INVENTORS.*

BY

AGENT.

3,042,421
TRAILER FOR TRANSPORTATION OF
ELONGATED FREIGHT
Fritz Buske and Gerhard Kuschel, both of Leipzig, Germany, assignors to VEB Schwermachinenbau S. M. Kirow, a corporation of Germany
Filed May 16, 1961, Ser. No. 110,480
10 Claims. (Cl. 280—81)

Our present invention relates to road-transportation carts and more particularly to trailers or bogies for transporting pipes, poles, girders, revolving cranes, logs and other elongated freight.

The road transportation of elongated freight is normally performed by truck-trailer combinations, with the front sections of the freight resting on the loading platform of the lead vehicle or truck and the rear section on a trailer or bogie hauled by the truck.

It is an object of the present invention to provide a trailer-type cart of simple design and sturdy but flexible construction for use in the haulage of tubes, pipes, timber and similar elongated freight.

It is another object of the present invention to provide a cart which can be easily controlled, can be provided with its own steering mechanism and offers no unduly increased resistance when passing a curve.

A still further object of this invention is the provision of a cart whose loading capacity can be readily changed by the substitution of one rear-wheel section for another.

According to a feature of our invention we provide a cart or trailer for hauling by trucks comprising a freight support tiltably mounted approximately above and at the center of a rocker frame having a pair of steerable front wheels and one or more wheels which are freely swivelable for independent yawing motion. According to a preferred embodiment of the invention the support has a generally triangular elevational outline, the base of the triangle serving as a load area for the freight while the apex is defined by a depending bifurcation accommodating a set of bearings for the rocker frame. The rocker frame is advantageously a relatively flat, upwardly and rearwardly inclined body in the shape of an isosceles triangle having the front wheels mounted on opposite sides of its base and its elevated apex provided with a mounting for a single rear wheel or a train of rear wheels. The front wheels may be interconnected by an articulated link to assure their proper co-ordination on curving roads.

An important advantage of a vehicle according to the present invention is the simplicity and sturdiness of its construction affording extremely high loading capacity with low dead weight and optimum utilization of the material used; another advantage resides in the ability of the vehicle to accommodate different tail assemblies of varied carrying capacity which may be interchangeably fitted to its frame and which may include any reasonable number of rear wheels mounted next to and/or behind one another.

These and other objects, features and advantages of the present invention will be better understood from the following description when read in conjunction with the accompanying drawing, in which.

Figure 1:
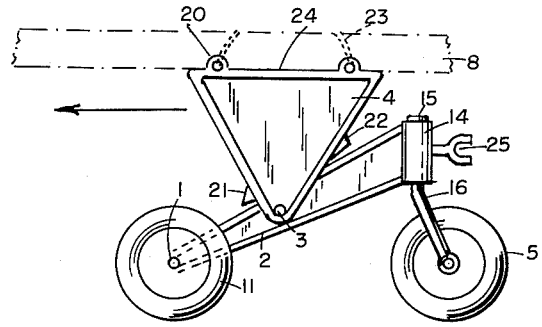
FIGS. 1, 2 and 3 are respectively side, front and top views of a single-rear-wheel embodiment of the invention.
Figure 3:
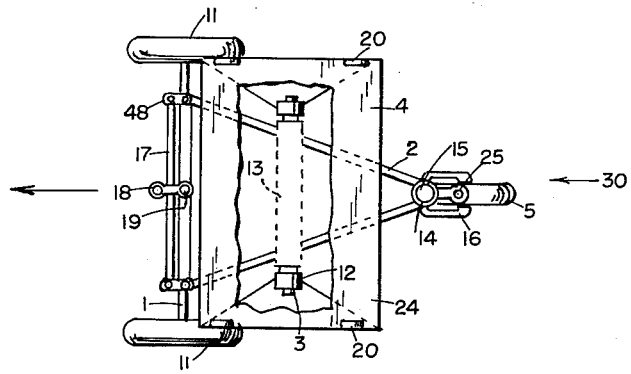
Figure 2:
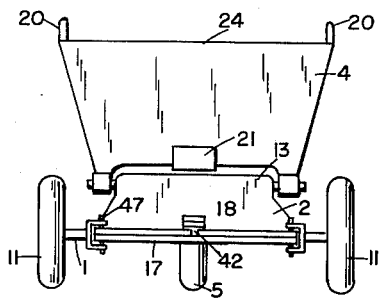
Figure 4:
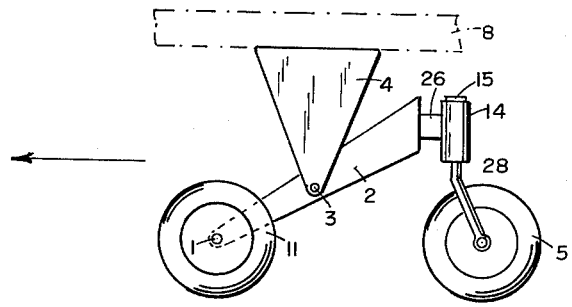
FIGS. 4 and 5 are views similar to FIGS. 1 and 3, respectively, of another embodiment of the invention employing two parallel rear wheels.

In the trailer-type vehicle shown in FIGS. 1, 2 and 3 an upwardly diverging support 4, made of iron sections and covered by steel plates, is bifurcated at its lower apex end and provided at each side of the apex with a bearing 12. The upper or base portion of the support is covered by a plate 24 which serves as a freight platform. Four lugs 20, one at each corner of the platform, are used for fastening the freight 8 (e.g. a raft of logs) by means of straps 23. The support 4 is mounted on a frame 2 of triangular shape, with the base of the triangle facing in the direction of motion, by means of a shaft 3 which is lodged in the bearings 12 on the support 4 and passes at its center section through an elongated bearing journal 13 located at the approximate center of the triangular frame 2. The frame 2 is also made of iron sections and covered by steel plates. Two wheels 11, one at each side of the front section of the frame 2, are rotatably mounted in forks 1 (best seen in FIG. 3) pivotable around respective studs 47 fastened to the frame 2. The wheels 11 are interconnected by a steering bar 17 articulated to a pair of knuckles 48 which are rigid with the forks 1. A tail section 30 comprising a rear wheel 5, mounted in the forked end 16 of a stud 15 swingable in a bearing sleeve 14, is swingably secured to the rear end of frame 2. Stops 21, 22 located on the front and rear walls of the support 4 abut the frame 2 when the support 4 is inclined forwardly or rearwardly by a large angle and keep the support from falling on the front wheels when the freight is removed. Hitches 18 and 25 on the front and rear of the trailer serve for attachment, to respectively, a tow bar of a truck or tractor and a second trailer towed behind the first one. Hitch 18 is swingable around pivot 19 and can be connected by bolt 42 with the steering bar 17, as shown in FIG. 3, to lead the front wheels 11 into a curve by following the movement of hitch 18.

Figure 5:
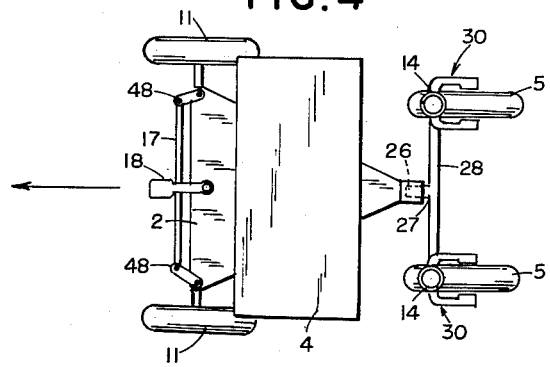
Figure 6:
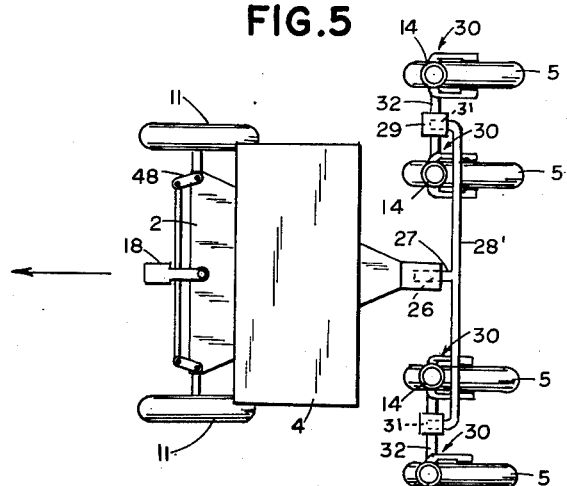
FIG. 6 is a top view of an embodiment with four parallel rear wheels.

The arrangement shown in FIGS. 5 and 6 is similar to the one described, except for the duplication of rear section 30 whose sleeves 14, swivelably supporting twin rear wheels 5, are interconnected by a lever bar 28 hinged to the rear of frame 2 by means of a stud 27 projecting from the center of the bar into a bushing 26. The remaining parts of the trailer are unchanged.

The load-carrying capacity of the trailer may be still further increased by the use of twin pairs of rear wheels as shown in FIG. 6. An extended bar 28' is mounted by means of its stud 27 in the bushing 26. The ends of bar 28' are bent to form studs 31 each of which fits snugly into a knuckle 29 at the midpoints of a respective auxiliary arm 32 rigid with the knuckle. Both the bar 28' and the arms 32 are therefore swingable in a plane normal to the direction of motion of the trailer on a straight path. A tail section 30 with rear wheel 5 is mounted on each side of each arm 32. Locking means (not shown in the drawing) are of course provided to keep the studs 27, 31 from slipping out of their bushings during operation.

Figure 7:
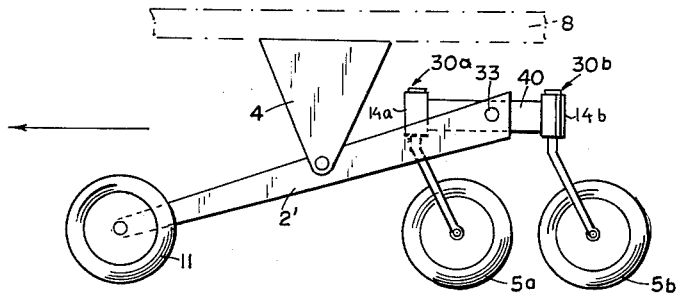
FIGS. 7 and 8 are respectively a side-elevational view and a top view of another embodiment with two rear wheels in tandem.
Figure 8:
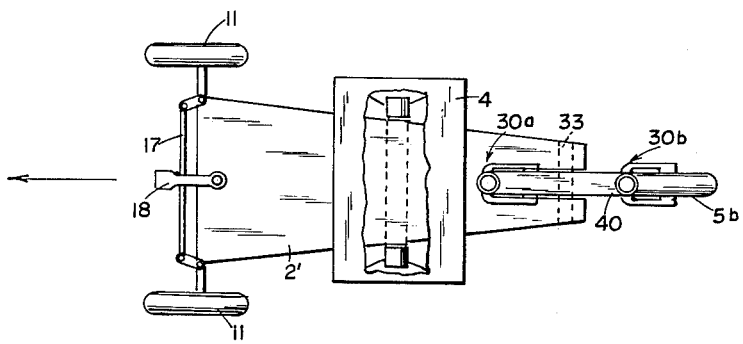

A further modified vehicle with a prolonged wheel base is shown in FIGS. 7 and 8 wherein the support 4, mounted on a somewhat longer frame 2' bifurcated at its rear end, is identical to that described with regard to FIGS. 1, 2 and 3. Two tail sections 30a and 30b, each with a respective rear wheel 5a, 5b swivelable in a sleeve 14a, 14b, are connected to opposite ends of a lever 40 extending in the direction of motion of the trailer; lever 40 is pivoted in the slotted portion of the frame 2' for surging movement in a vertical plane, by a stud 33 protruding on both sides of the lever 40 into openings formed in the prongs of the bifurcated end of frame 2'.

Figure 9:
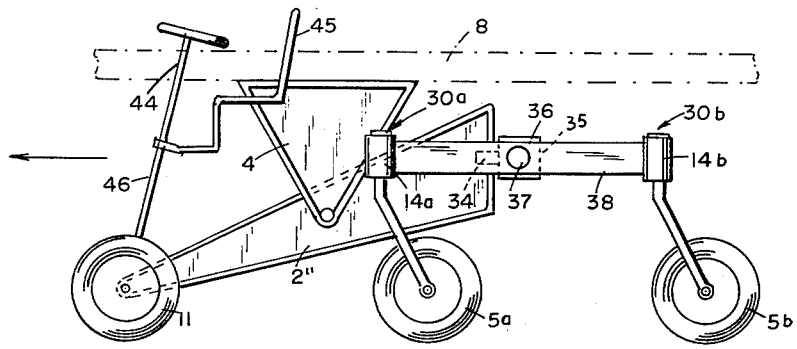
FIGS. 9 and 10 are similar views of a still further embodiment having four rear wheels.
Figure 10:
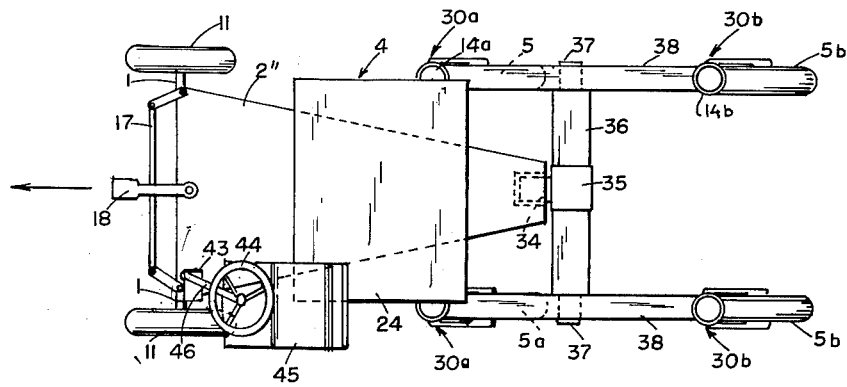

In the cart shown in FIGS. 9 and 10 two parallel bars 38, lying in line with the direction of travel of the vehicle, bear at each end respective tail section 30a, 30b with a sleeve 14a, 14b for a wheel 5a, 5b. The rear end of the frame 2" has a socket 34 for a stud 35 protruding from the center of a normally horizontal lever 36 which extends perpendicularly to the bars 38 and has its opposite ends articulated to them by means of two pins 37. Thus, each bar 38 with its two wheel mounts 14a, 14b is able to swing in a plane transverse to lever 36 about the respective pin 37. Locking means (not shown) are again provided to secure the pivots. The remaining parts of the trailer do not differ from those of FIGS. 1 and 2.

The extended wheel base and the complex kinematic arrangement of the two embodiments last described make them particularly suitable for hauling of heavy freight on narrow forest paths.

The embodiment shown in FIGS. 9 and 10 is also provided with its own steering mechanism comprising a conventional steering gear 43 e.g. of the worm type, a steering wheel 44 and a steering column 46. A driver's seat 45 is conveniently fastened to the left side of the support 4.

The trailer-type vehicle or card herein disclosed may be modified in various respects, e.g. through combination of compatible features from different embodiments or in some other manner readily apparent to persons skilled in the art, without departing from the spirit and scope of our invention except as otherwise limited in the appended claims.

We claim:

1. A trailer for the haulage of elongated freight partially supported on a lead vehicle, comprising an upwardly and rearwardly inclined frame of a plan outline generally in the form of an isosceles triangle with rearwardly directed apex, a pair of steerable front wheels swingably secured to the forward end of said frame at opposite ends of the triangle base, a tail assembly pivotally secured to said frame at said apex, said assembly including at least one rear wheel swingable about a generally vertical axis, a support of generally triangular elevational outline for said freight forming a generally horizontal platform above said frame, and pivot means swingably securing said support at the apex of its triangular outline to an intermediate portion of said frame for rocking movement about a horizontal axis.

2. A trailer for the haulage of elongated freight partially supported on a lead vehicle, comprising an upwardly and rearwardly inclined frame of a plan outline generally in the form of an isosceles triangle with rearwardly directed apex, a pair of steerable front wheels swingably secured to the forward end of said frame at opposite ends of the triangle base, a tail assembly pivotally secured to said frame at said apex, said assembly including a plurality of rear wheels mounted for independent yawing motion, a support of generally triangular elevational outline for said freight forming a generally horizontal platform above said frame, and pivot means swingably securing said support at the apex of its triangular outline to an intermediate portion of said frame for rocking movement about a horizontal axis.

3. A trailer according to claim 2 wherein said tail assembly includes a bar fulcrumed at the apex of said frame for swinging movement in a plane transverse to the direction of travel, said bar being provided at each end with a journal accommodating a respective rear wheel.

4. A trailer according to claim 2 wherein said tail assembly includes a bar fulcrumed at the apex of said frame for swinging movement in a plane transverse to the direction of travel, said bar being provided at each end with a respective auxiliary arm journaled thereto for swinging movement in a plane transverse to said direction of travel, each of said auxiliary arms being provided at each end with a journal accommodating a respective rear wheel.

5. A trailer according to claim 2 wherein said tail assembly includes a bar fulcrumed at the apex of said frame for swinging movement in a vertical plane parallel to the direction of travel, said bar being provided at each end with a journal accommodating a respective rear wheel.

6. A trailer according to claim 5 wherein said frame is bifurcated at its apex, said bar being at least partially received in the bifurcation of said frame.

7. A trailer according to claim 2 wherein said tail assembly includes a bar fulcrumed at the apex of said frame for swinging movement in a plane transverse to the direction of travel, said bar being provided at each end with a respective lever journaled thereto for swinging movement in a plane transverse to said bar, each of said levers being provided at each end with a journal accommodating a respective rear wheel.

8. A trailer for the haulage of elongated freight partially supported on a lead vehicle, comprising a frame, a pair of steerable front wheels swingably secured to the forward end of said frame, a tail assembly pivotally secured to said frame at its rear, a support for said freight forming a generally horizontal platform above said frame, and pivot means swingably securing said support to an intermediate portion of said frame for rocking movement about a horizontal axis, said tail assembly including a bar swingable in a generally vertical plane, at least two generally vertical bearing sleeves supported on opposite ends of said bar, and at least one pair of rear wheels respectively journaled on said sleeves.

9. A trailer according to claim 8 wherein said rear wheels are positioned alongside each other.

10. A trailer according to claim 8 wherein said rear wheels are positioned in tandem behind each other.

References Cited in the file of this patent

UNITED STATES PATENTS

| 2,032,721 | Schaeffer | Mar. 3, 1936 |
| 2,256,594 | Ingram | Sept. 23, 1941 |
| 2,921,784 | Miller | Jan. 19, 1960 |